United States Patent [19]

Elias

[11] Patent Number: 4,760,949

[45] Date of Patent: Aug. 2, 1988

[54] COMPOSITE CONTAINER WITH HIGH BARRIER LINER LAYER AND METHOD OF FORMING THE SAME

[75] Inventor: Thomas C. Elias, Ballwin, Mo.

[73] Assignee: Sonoco Products Company, Hartsville, S.C.

[21] Appl. No.: 104,942

[22] Filed: Oct. 6, 1987

Related U.S. Application Data

[62] Division of Ser. No. 915,549, Oct. 6, 1986, Pat. No. 4,717,374.

[51] Int. Cl.$^4$ .............................................. B65D 3/22
[52] U.S. Cl. ............................... 229/4.5; 229/3.5 MF; 229/48 T; 428/35; 428/57; 428/192
[58] Field of Search .................. 229/4.5, 5.5, 48 T, 229/48 SA, 48 SC, 3.5 MF; 428/35, 36, 57, 192

[56] References Cited

U.S. PATENT DOCUMENTS

| 3,279,675 | 10/1966 | Elam et al. | 229/4.5 |
| 3,386,645 | 6/1968 | Powell | 428/35 |
| 4,286,745 | 9/1981 | Fukuoka | 229/4.5 |

FOREIGN PATENT DOCUMENTS 1013656 12/1965 United Kingdom ................. 229/4.5

Primary Examiner—Stephen Marcus
Assistant Examiner—Gary E. Elkins
Attorney, Agent, or Firm—Laubscher & Laubscher

[57] ABSTRACT

A composite container includes a high barrier inner liner member including a metal layer of vacuum-deposited aluminum parallel with and spaced from the longitudinal edge of a synthetic plastic base thereby to define a first web that is helically wound in edge-overlapping relation such that one longitudinal edge of the metal strip overlaps the other longitudinal edge of the metal strip by a given distance (d). The overlapping edges of the first web are hermetically joined by a heat-sealable bond between an adhesive layer covering the metal strip and the adjacent face of the first web, and a compatible heat-sealable layer on the opposite face of the web. According to the method for forming the container, the first web is formed by longitudinally slitting a supply web having longitudinally extending spaced metal strips on one face thereof along lines of severance spaced from the edges of the metal strips, so that the edges of the metal strip in the helically wound liner layer will be isolated from the container contents. The resultant container provides high storage stability, particularly for contents that are corrosive to aluminum.

12 Claims, 5 Drawing Sheets

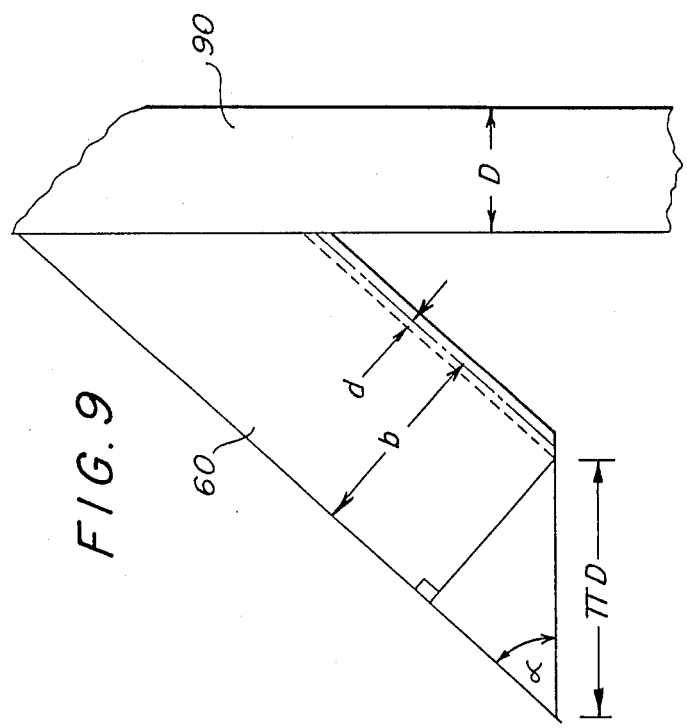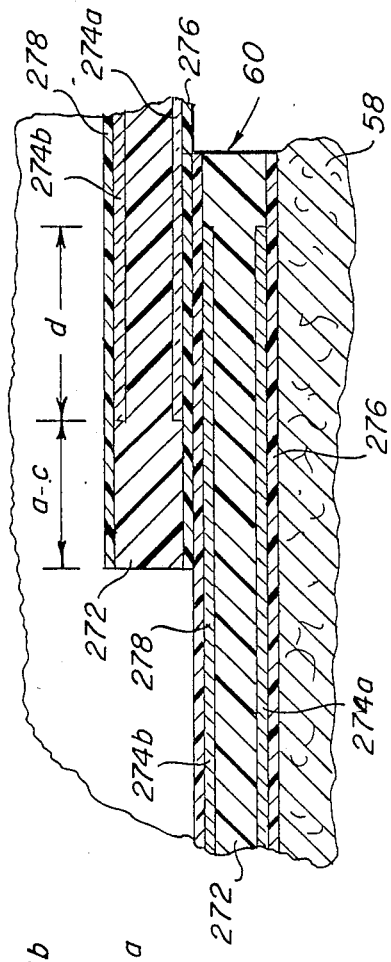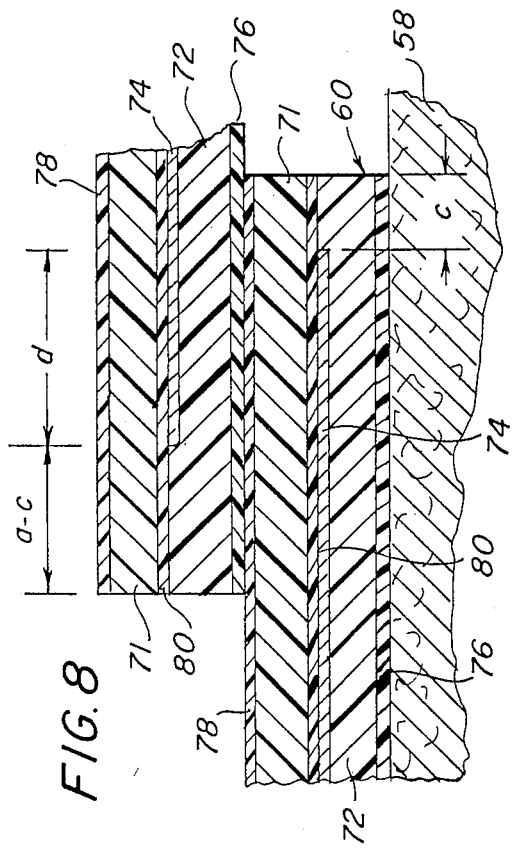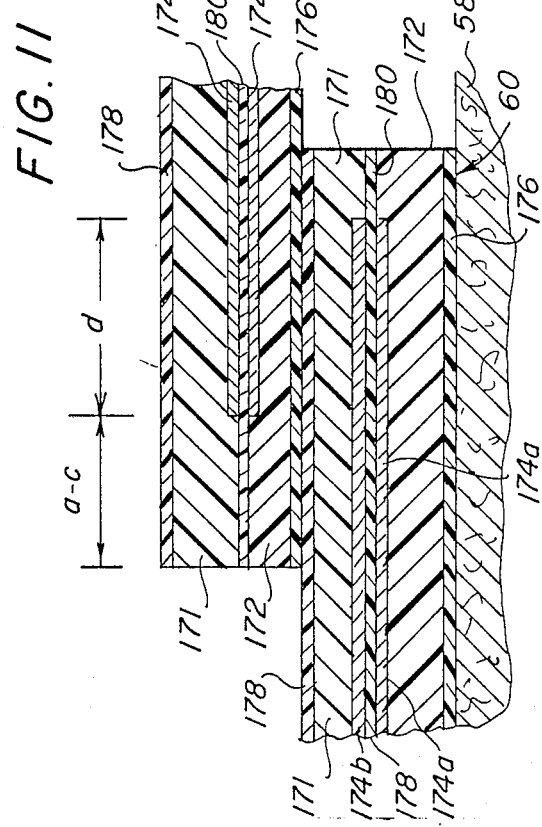

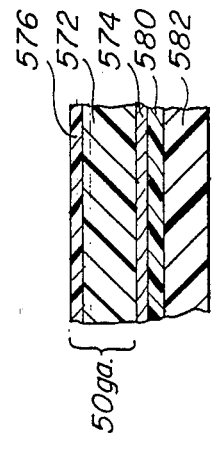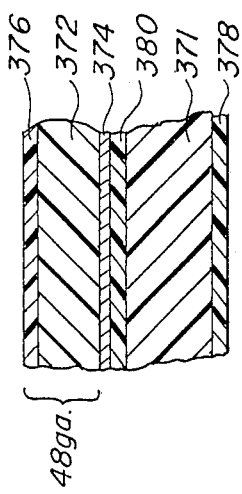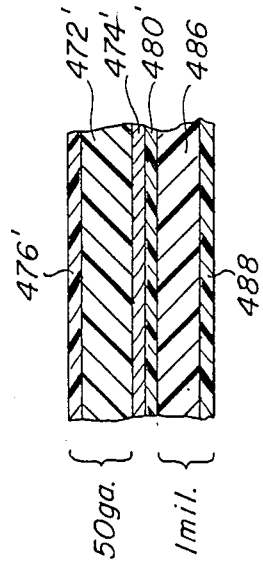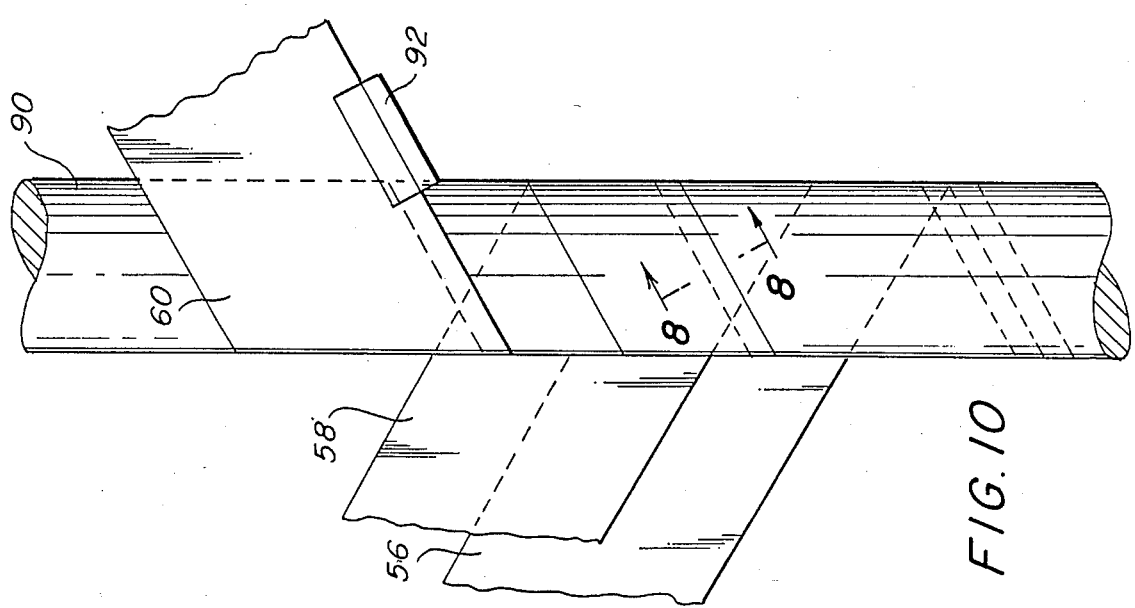

| EXAMPLE NO. | DESCRIPTION | OPTICAL DENSITY | OXYGEN PERMEABILITY CC/100 IN.²/ 24 HRS. | WATER VAPOR PERMEABILITY grams/100 sq. in./ 24 HRS. |
|---|---|---|---|---|
| 1 | 48 ga. Melinex 850 metallized/adh./ metallized 48 ga. Melinex 850. | 4.36 | .00913 | .0070 |
| 1b | Same as above, but 2nd layer of film is clear. | 2.57 | .0265 | .0184 |
| 2a | 60 ga. Melinex 3093 metallized adh metallized 60 ga. Melinex 3093. | 4.39 | .00374 | .0103 |
| 2b | Same as above, but 2nd layer of film is clear. | 2.64 | .0115 | .0697 |
| 3 | 48 ga. Melinex 850 metallized/adh 1 mil HDPE PVDC ctd. | 2.53 | .0103 | .0223 |
| 4a | 50 ga. M-24 Mylar/adh/1 mil Coex film (PP-PE-EVA). | 2.47 | .0105 | .0408 |
| 4b | 50 ga. M-24 Mylar/adh/1 mil HDPE film PVDC ctd. | 2.32 | .0102 | .0826 |
| 5 | 50 ga. M-24 Mylar/primer/15#/zm. extrusion coating of EVA (19%). | 2.42 | .0109 | .0892 |
| CONTROL | Clear 48 ga. Melinex 850/adh/clear | 0.06 | 4.578 | 1.6043 |

* 100°F., 90% RH

FIG. 17

# COMPOSITE CONTAINER WITH HIGH BARRIER LINER LAYER AND METHOD OF FORMING THE SAME

SPECIFICATION

This application is a division of application Ser. No. 915,549, filed Oct. 6, 1986 now U.S. Pat. No. 4,717,374 issued 1/5/88.

BACKGROUND OF THE INVENTION

The present invention relates to a composite container including at least one tubular fibrous body wall, and a high barrier inner liner member covering the inner surface of said body wall, which composite container is adapted for holding liquids, corrosive products, and products which require storage at non-atmospheric conditions. A high barrier liner is necessary if the composite container in which the liner member is used is to hold a pressured product, such as carbonated liquid, a vacuumed product, such as nuts or potato chips, or products flushed with an inert gas. It is desirable that the liner contain at least one layer of aluminum since aluminum is one of the most cost-effective means for achieving oxygen and water vapor resistance.

The various liner constructions presently employed in composite containers adapted for holding liquids, corrosive materials and non-atmospheric pressurized products possess certain serious drawbacks. For example, in the prior "Anaconda fold" construction—as taught by the Krause U.S. Pat. No. 3,156,401—an edge folding technique for helically wound layers is disclosed which possesses the drawback that it produces a comparatively thick step in the body wall thickness. Even with tough, thin liner components, the step is relatively thick since it contains three layers of liner. Secondly, if a stress is imposed across the liner heat seal, such as by the body resisting internal pressure, the seal is pulled in a peel mode. A heat seal stressed in peel has a stress concentration along the edge of the seal and is far weaker than if the seal were stressed in shear. Thirdly, owing to the round shape of the rolled edge of the fold, there is too often a channel under the seal which cannot be properly sealed off by the end compound in the seam where the liner heat seal meets the metal end.

In the "free foil" liner disclosed in the patents to Wannamaker et al U.S. Pat. No. 3,428,239 and Ahlemeyer U.S. Pat. No. 3,520,463, for example, a paperless film-foil laminate is heat sealed to form an overlapped seam. A problem with this construction for a container which is to hold liquid beverages is that the contained product is free to attack the bare foil edge. Even if the product is not spoiled by the dissolved metal, the seam will be weakened and will open, whereby the can will leak.

In the lapped liner heat seal type of seam construction shown in the Krause U.S. Pat. No. 3,288,341, a tape member is provided over the lapped liner heat seal. While the taped lap seal is thinner than the Anaconda fold, the extra thickness of the tape makes more difficult the task of achieving a hermetic seal with the ends. Applying the tape during the tube winding operation and keeping it properly aligned adversely affect line efficiency. Furthermore, the additional expense of the additional tape member is a cost factor to be avoided.

SUMMARY OF THE INVENTION

It is therefore an object of the present invention to provide a composite container including at least one tubular, fibrous body wall layer and a high barrier inner liner layer, which container is adapted for holding liquids, corrosive materials, gas flushed, and pressured or vacuumed products. More particularly, it is a primary object of the present invention to provide a composite container which includes a liner member having a metal layer no part of which is exposed to the interior of the composite container in which the liner is used.

A further object of the present invention is to provide a composite container including a metallized liner member which affords an improved leakproof rolled seam connection with the metal end closure member.

An additional object of the present invention is to provide a composite container including a liner member which is helically wound in edge-overlapping heat sealed relation wherein the lapped edges are sealed in a strong, durable and leakfree manner.

The composite container according to the present invention includes at least one tubular, fibrous body wall and a high barrier inner liner member. The inner liner includes a synthetic plastic film and a thin metal layer, on the order of $1 \times 10^{-6}$ inch thick, of metallized material deposited on at least one face of the base film at intervals corresponding to the width of the individual rolls of liner, thereby to define metal-free strips parallel to the edge of the web. The inner liner member further includes a first layer of heat sealable synthetic plastic material covering the other face of the metallized film, and a second layer of heat sealable synthetic plastic material covering the metallized surface of the base film. The innermost heat sealable surface and the exposed sealable surface over the metallized layer are selected to be heat seal compatible with each other.

According to a further object, a method for forming composite containers is provided, wherein the inner liner is helically wound in edge-overlapping heat sealed relation to form a tube. The individual rolls of liner are slit so the edge overlapping on the interior of the container includes one of the metal free strips. The overlapping distance of the edges of the inner liner is sufficient to cause the adjacent edges of the metallized band to be in overlapping relation, whereby the metallized region extends completely around the interior of the container body wall to provide product protection, the edges of the metallized band being isolated from the container contents.

As a consequence of the invention, a high barrier liner construction is provided including a straight lapped joint, which high barrier liner is resistant to most food products, including aqueous and greasy foods. The liner assures a hermetic sealed connection with the metal end closure members, and the liner is particularly suited for use in connection with a rolled end and heat sealed membrane end closure: The liner produces a much smoother interior of the container, facilitating dispensing by a plunger. As for example, in containers for caulking material, grease and the like. The high barrier liner will have an absolutely minimum effect upon the flavor or odor of the container contents.

BRIEF DESCRIPTION OF THE DRAWINGS

Additional objects and advantages of the present invention will become apparent from the following detailed description when viewed in the light of the accompanying drawing, in which:

FIG. 8 is a cross-sectional view of the lapped heat seal of the present invention showing the relative position of the metallized layer on each edge of the seal taken along line 8—8 of FIG. 10;

FIG. 9 is a diagrammatic illustration of the manner for calculating the required width of the metallized band between the metal free strips;

FIG. 10 is a top view of the helical winding process employed to form the composite container of the present invention;

FIGS. 11 and 12 are detailed sectional views of the lap joints of two alternate embodiments of the invention, respectively;

FIGS. 13-16 illustrate examples of laminates suitable for use with the present invention; and FIG. 17 is a table comparing the physical properties of various specific examples of the invention.

DETAILED DESCRIPTION

Figure 1:
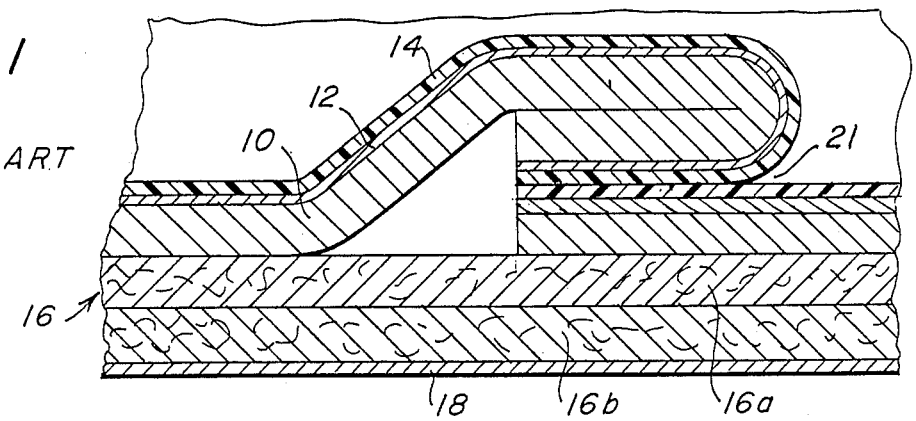
FIGS. 1-4 are cross-sectional views of various liner member constructions of the prior art, respectively.

Referring first more particularly to FIG. 1, the prior art type of inner liner heat seal most often produced for composite containers is known as an "Anaconda fold", as disclosed by U.S. Pat. No. 3,156,401. The liner includes a backing layer 10, a metal foil layer 12, and a heat sealable film layer 14, which liner layer is arranged on the inner surface of fibrous body wall 16 having an outer label layer 18. For carbonated beverage containers, the Anaconda fold construction has the inherent drawbacks referred to above. For example, owing to the round shape of the rolled edge of the fold, an undesirable channel is formed under the seal which cannot be properly sealed off by the end compound in the seam 21 where the liner heat seal meets the metal end.

Figure 2:
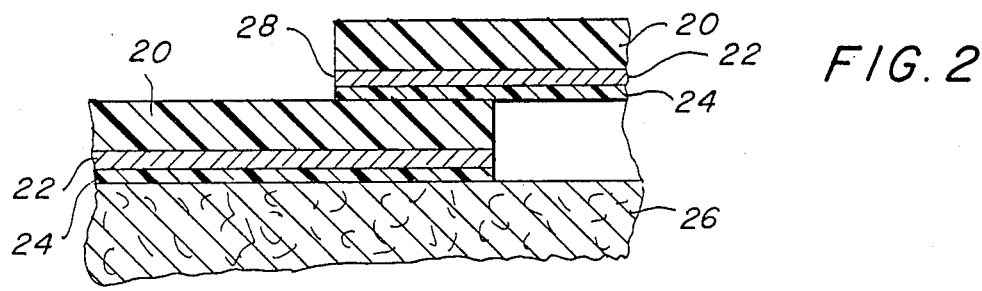

FIG. 2 illustrates a prior art paperless filmfoil laminate heat sealed front to back to form an overlapped joint. Such a liner construction is sometimes known as a "free foil" liner. Film layer 20 is laminated with metal foil layer 22 and the overlapping edges of the laminate are bonded by sealing layer 24. The liner is located adjacent fibrous body wall 26. A problem with this construction for liquid beverages is that the contained product is free to attack the bare foil edge 28. Even if the product is not spoiled by the dissolved metal, the seam will be weakened and will open whereupon the can will leak.

Figure 3:
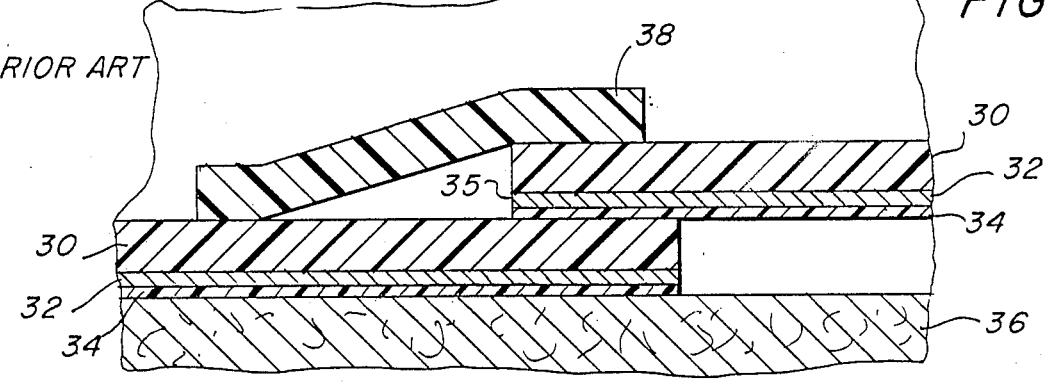

FIG. 3 discloses the prior art construction including a tape member 38 located over the lapped liner heat seal. The film and metal foil layers 30 and 32, respectively, are laminated together and helically wound, the overlapping edges being bonded by sealant 34. If done properly, the tape 38 isolates the product from the metal foil edge 35. The liner is located adjacent the inner surface of fibrous body wall 36. The tape is adhered to the liner surface with a pressure sensitive adhesive.

Figure 4:
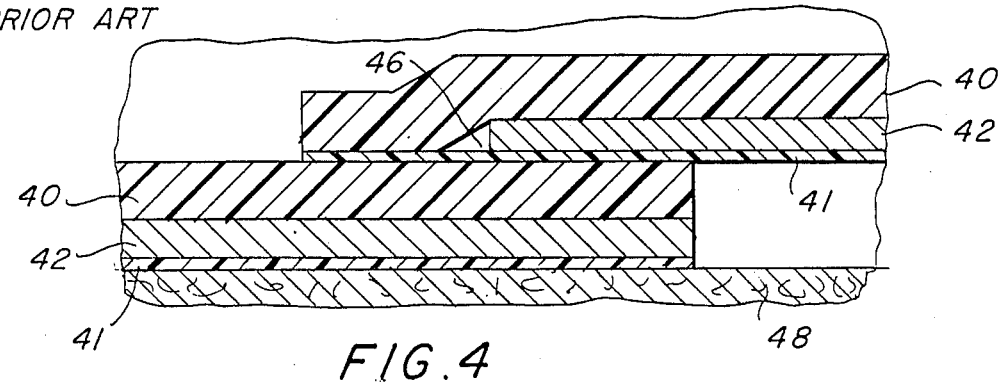

FIG. 4 discloses a proposed type of lapped liner heat seal for protecting the edge of the foil, which has proven to be commercially impractical to manufacture in a large scale production process, since it is not commercially feasible to remove (by skiving, for example) the foil from the edge at location 46 of the film (40) foil (42) laminate. Moreover, it is difficult to clearly remove a strip of 0.00035 in. foil from a 0.001 in. thick film by a machine that is to run continuously. A heat seal coating is still required to make the lap seal. Another method to produce a laminate whose foil layer does not extend to the edge would be to design the laminator to use foil narrower than the film. This would require the use of film only as wide as one roll of liner (i.e., 6 inches) or at the most, two widths wide. Running multiple narrow widths of foil with wider film is not believed to be possible with any equipment in existence. Furthermore, owing to the thickness of the foil relative to the film, the absence of the foil from location 46 to the edge of the roll would cause the edge to be very soft and easily damaged. Another option for achieving the configuration of FIG. 4 is to laminate narrow foil to film in-line on the tube winder. However, adhesive application and drying problems, the need for quick tack, and alignment problems prevent serious contemplation of in-line laminating of free foil.

Figure 5:
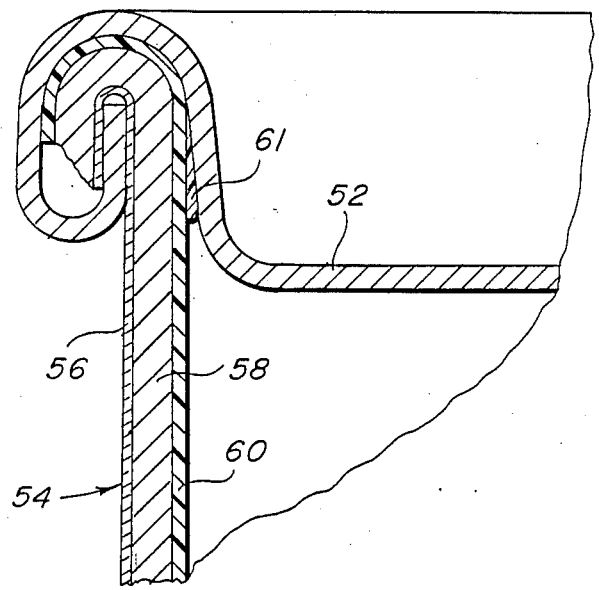
FIG. 5 is a partial cross-sectional view of a composite container according to the present invention.

Referring now to the construction of the present invention illustrated in FIG. 5, the composite container includes a metal end closure member 52, and a composite body member 54, including an outer label layer 56 (for example, a paper/foil laminate), at least one fibrous body wall layer 58, and an inner liner layer 60. An end sealing compound 61 is provided between composite wall and the metal end, as is conventional in the art.

Figure 6:
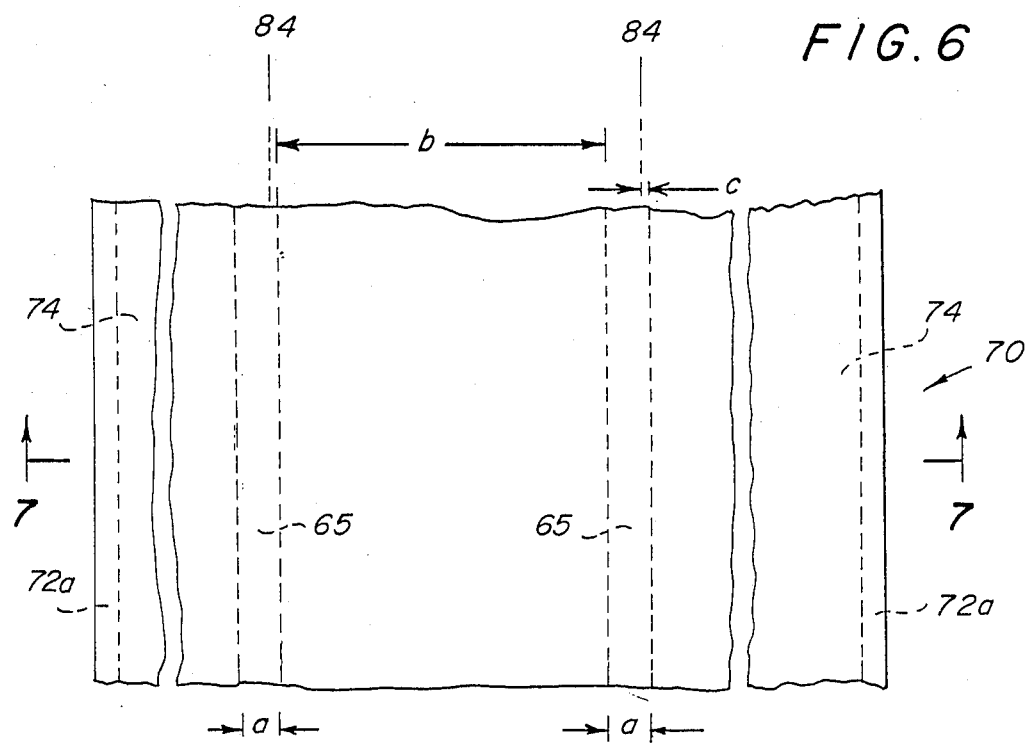
FIG. 6 is a top view of the web member of the present invention.
Figure 7:
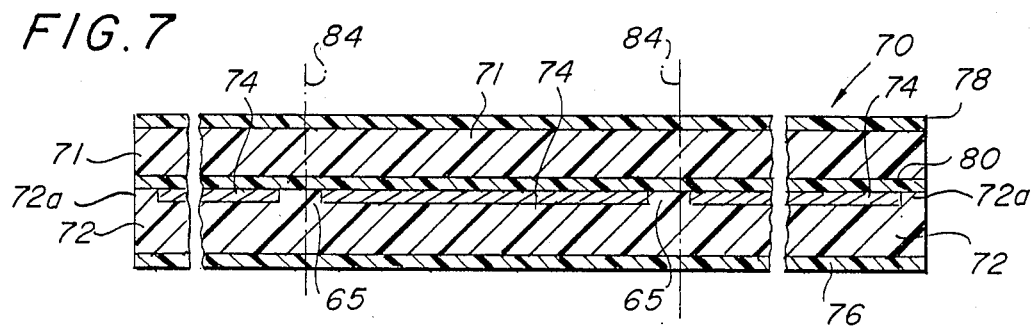
FIG. 7 is a cross-sectional view of the web member taken along line 7—7 of FIG. 6.

With reference to FIGS. 6 and 7, the inner liner layer 60 is formed from a supply web 70 which includes a synthetic plastic film 72 having a layer of metallized material 74, preferably of aluminum, deposited by vacuum deposition on at least one face of said base layer web 72. The metallized layer 74 is applied with the aid of masks so that it contains multiple parallel sharply defined metal-free strips 65. The metal-free strips have a predetermined width (a), and are parallel with and spaced a predetermined distance (b) from one another and from the edges of web member 70, the predetermined distances (a) and (b) being important to the invention, as will be set forth in greater detail below. The sum of the distances (a) and (b) constitute the width of an individual roll of liner when slit along lines 84. The slitting line 84 is positioned a distance (c) from one edge of a metal-free strip. The value of (c) is typically 0.05 in. It must exceed the tolerance of the equipment used to slit the individual rolls, to prevent exposure of metal on the edge. The outermost two metal layers 74 are spaced from the longitudinal edges of the web by the edge portions 72a of synthetic plastic layer 72.

FIG. 8 shows a detailed sectional view taken through the lapped heat seal of the present invention normal to the longitudinal edge of the web. Adjacent edges of the metallized layer 74 overlap each other by a distance (d). Distances (a) plus (d) equal the total width of the heat sealed lap.

In theory, distance (d) may be quite small. It need be only sufficiently large that the lateral permeability across distance (d), of gases from or toward the product, is small compared to the permeability through the metallized layers. In practice, distance (d) must be sufficiently great so that dimensional tolerances in metallizing, slitting or winding the tube, do not produce a failure to overlap the metallized edges (a negative value of (d)). Experience has shown that with good production practices, an allowance of 0.1 in. for the distance (d) is sufficient.

The thickness of the step at the lap is the thickness of one layer of the finished liner. In the preferred embodiments, this dimension is less than 0.002 in. and may be as low as 0.001 in. On the other hand, with the commonly practiced prior art of FIG. 1, the thickness of the step is twice the liner thickness. Paper-backed liners employed are commonly 0.025 to 0.045 in. thick, for a single ply. Thus, with the present invention, the step at the liner joint is 1/9 to 2/7 as thick as commonly practiced. Thus substantial reduction in the thickness of the lap greatly facilitates achieving a hermetic connection with the metal end closure members.

Referring to FIG. 9, the width of the metallized band (b) is dependent upon the angle ($\alpha$) the axis of the liner makes with the axis of the winding mandrel 90. The angle ($\alpha$) is measured from a line drawn normal to the axis of the mandrel. It is the acute angle the liner makes with the cut end of a tube. Hereafter ($\alpha$) is known as the winding angle. The value of (b) is also dependent upon the diameter of the winding D mandrel (90) which establishes the inner circumference of the tube. As shown in FIG. 9:

$$\frac{b-d}{\pi D} = \sin \alpha$$

whereupon:

$$b = ('D \sin \alpha) + d$$

It should be noted that the winding angle of the liner will be slightly larger than the winding angle of an outer ply label whose printing matches perfectly. Specifically, Tan $\alpha$ Label/Tan $\alpha$ Liner=D/(D+2W) where W is the total thickness of the body wall of the tube.

Successive layers of the liner web 60, fibrous paperboard layer 58 and label layer 56 are wound on the mandrel as shown in FIG. 10, the liner edge heating means 92 being illustrated diagrammatically.

Referring again to FIG. 7, the metallized layer 74—preferably, aluminum—is applied, for example by vacuum deposition, upon a base film 72. While the metallized coating is relatively thin, (approximately $1 \times 10^{-6}$ inches) it very substantially improves the barrier properties of the base film. The amount of metal applied per unit area is important to the present invention in that the amount must be sufficient to provide a barrier to oxygen, water vapor and carbon dioxide. The amount of metal applied is most conveniently inferred from measuring the optical density of the metallized film. For this invention, individual metallized layers have an optical density no less than 2.6 and no more than 3.5. The metallized layer being negligible in thickness compared to the base film, there is no appreciable variation in thickness of the liner material between the metallized bands and the metal-free spaces therebetween. Preferably, the base film is selected from the family of films classified as oriented polyethylene terephthalate. The base film includes a discrete sealing layer 76, for example, a coextruded copolyester. To the metallized surface is applied a second resinous layer 71 (for example, oriented polyethylene terephthalate) with an exposed surface layer 78 (for example, a coextruded polyester). The second resinous layer is attached to the metallized surface by an adhesive layer 80 (for example, of polyurethane). Alternately, the second resinous layer may be an extrusion coating, in which case, the layer 80 is a primer and the exposed surface 78 cannot be distinguished from layer 71.

In all instances, it is a characterizing feature of the present invention that surface 76 must heat seal securely to surface 78. Whichever surface is exposed to the product must be compatible with, and resistant to, the product. Furthermore, the bond between surfaces 76 and 78 must not separate when the composite body is flanged in preparation for attaching a metal end. This invention benefits from the fact that the heat seal is stressed in the shearing mode. As such, it is much stronger than if the geometry caused the bond to be stressed in the peeling mode, as is the case with the Anaconda fold.

The second resinous layer 71 may, in fact, be identical to the base film, which of course, makes surfaces 76 and 78 the same and automatically heat seal compatible. Thus, as shown in FIG. 11, the second film 171 is also strip metallized, in which case the metal-free strips 174a and 174b are laminated in registry. As will be seen in Table I, exceptional barrier results from this construction. Alternately, as shown in FIG. 12, the base film 272 may be strip metallized on both sides with layers 274a and 274b, and sandwiched between two heat sealable films 276 and 278 (for example, heat sealable oriented polypropylene), as shown in FIG. 12.

A further requirement for the product contact surface, 76 or 78, is that it must have sufficient mobility over a winding mandrel to allow tubes to be wound. The opposite exposed surface must allow it to be adhered to the inner ply of paperboard by any of the known techniques. Between surfaces 76 and 78, they must have sufficient thickness and flow to allow a hermetic seal to be made. Neither surface should have been applied from a solvent solution, i.e., heat seal lacquer. Such lacquers typically contain low molecular weight polymers which are susceptible to softening by product components. The product contact surface must not add to or subtract from the flavor of the product. The liner construction must meet FDA requirements.

Specific examples of constructions which meet the various criteria set forth above, are as follows, reference being made to Table I of FIG. 17.

Example No. 1

Referring to FIG. 11, a 48 gage (i.e., 0.00048 inch) Melinex 850 (ICI Americas, Inc.) film 172 (formed of an oriented polyester coextruded with a copolyester sealing layer) is strip metallized on its non-sealable surface by the vacuum deposition of aluminum with a mask and is bonded by a layer of high performance adhesive (such as a polyurethane/polyester adhesive) to a corresponding layer 171 with the metallized strips 174a and 174b being in registry. Alternatively, the metal strips 174b on the second Melinex 850 sheet may be omitted. Camvac International, Inc. of Brewster, N.Y. has demonstrated its ability to metalize polyester film leaving sharply defined metal-free spaces.

Example No. 2

Same as above except Melinex is 60 ga. and the increase in gage is due totally to an increase in thickness of the sealing layer. Film is designated as Melinex 3093.

Example No. 3 (FIG. 13)

48 ga. Melinex 850 strip 372 provided with metallized strips 374 on non-sealable surface and laminated with high performance adhesive 380 to the uncoated side of a 1 mil high density polyethylene (HDPE) film coated with polyvinylidene chloride (PVDC) layer 378. A suitable PVDC coated film is available from Arnold Cellophane of Miami, Fla. Copolyester sealing surface 376 is towards the product. A suitable adhesive is Morton Chemical Co's. Adcote 548. The copolyester sealing layer of the Melinet film seals tightly to the PVDC layer of the second film, the HDPE layer assisting in producing a hermetic seal.

Example No. 4

Referring to FIG. 14, a 50 ga. M-24 Mylar sheet (E. I. DuPont DeNemours & Co., Inc.) 472 having a PVDC layer 476 is provided on its uncoated side with metallized strip 474, and is laminated by layer 480 of high performance adhesive (such as urethane/polyester adhesive to a 1.5 mil coextruded polyolefin film (DSF 300, Crown Advanced Films, San Leandro, Calif.) having layers 482, 484 and 486 of propylene, polyethylene and ethylene vinyl acetate (EVA) respectively, the EVA surface being exposed.

In the modification of FIG. 15, the laminating adhesive layer 480' bonds the M-24 Mylar sheet to a 1 mil layer of high density polyethylene 486 that is coated with an exposed layer 488 of PVDC. The PVDC surface of the Mylar seals firmly and hermetically to the EVA surface.

Example No. 5

Referring to FIG. 16, a 50 gage M-24 Mylar sheet 572 is metallized on is uncoated side to define the aluminum strip 574, and is extrusion coated over a catalyzed primer 580 with a layer 582 of 15 #/3000 ft. sq. 18% (UE 652-00, U.S. Industrial Chemicals Co.) vinyl acetate copolymer. The PVDC surface 576 of the Mylar is exposed to the product. The PVDC surface seals tightly and hermetically to the EVA coating.

What is claimed is:

1. In a composite container of the type including at least one tubular helically wound fibrous body wall layer (56) having inner and outer surfaces, and a helically wound inner liner layer (60) covering said inner surface of said body wall layer, the improvement wherein said inner liner layer comprises:
   (a) a base layer web (72) formed of synthetic plastic material and having a pair of longitudinal edges and a pair of opposed faces;
   (b) a first high-barrier strip of metallized material (74, 174, 274) deposited on at least one face of said base layer web, said strip having a pair of longitudinal parallel edges and a width less than that of the web, said strip being parallel with and spaced at each edge at least a predetermined minimum distance (c) from the corresponding longitudinal edge of said web, said metallized strip having a thickness that is relatively thin with respect to the thickness of said base layer web;
   (c) a first layer of heat sealable synthetic plastic material (76, 176, 276) completely covering the other face of said web; and
   (d) a second layer of heat sealable synthetic plastic material (78, 178, 278) completely covering said metallized strip and said one web face;
   (e) said base layer web being helically wound with successive edge portions arranged in overlapping relation with the corresponding synthetic plastic layers being heat seal bonded together, thereby to form a helical lapped-seamed tube, the overlapping distance of said edge portions of said base layer web being such as to cause the edges of said helically wound metallized strip to overlap a given distance (d), whereby said metallized strip extends in high barrier relation completely around the interior of the container body wall with the edges of said strip being isolated from the contents of the container.

2. A composite container as defined in claim 1, wherein the metallized strip is formed from vacuum deposited aluminum.

3. A composite container as defined in claim 2, wherein said metallized strip has a thickness of about $1 \times 10^{-6}$ inch.

4. A composite container as defined in claim 2, wherein said metallized layer has an optical density no less than 2.6 and no greater than 3.5.

5. A composite container as defined in claim 1, wherein said base layer web is formed from oriented polyethylene terephthalate.

6. A composite container as defined in claim 5, wherein said second layer comprises a coextruded polyester.

7. A composite container as defined in claim 1, wherein said base layer web has a thickness of from about 0.0048 inch to about 0.0060 inch.

8. A composite container as defined in claim 7, wherein said predetermined minimum distance (C) is about 0.05 inch.

9. A composite container as defined in claim 1, and further including a second web (71, 171) of synthetic plastic material bonded to said second layer of said base layer web, and a third layer (78, 176) of heat sealable material covering said second web, said third layer being of a material that is heat sealable with said first layer.

10. A composite container as defined in claim 9, wherein said second web is provided with a second high-barrier strip (274b) in registry with said first strip (274a).

11. A composite container as defined in claim 9, wherein said second web is adhesively bonded to said first web.

12. A composite container as defined in claim 11, wherein said second web is bonded to said first web by an urethane adhesive.

* * * * *